United States Patent
Lou et al.

(10) Patent No.: US 9,142,234 B1
(45) Date of Patent: Sep. 22, 2015

(54) DISK DRIVE EMPLOYING MODEL-BASED FEED-FORWARD COMPENSATION DURING SEEK SETTLING

(75) Inventors: Mingji Lou, Corona, CA (US); Orhan Beker, Aliso Viejo, CA (US); Kexiu Liu, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 51 days.

(21) Appl. No.: 13/492,449

(22) Filed: Jun. 8, 2012

(51) Int. Cl.
*G11B 5/596* (2006.01)
*G11B 5/55* (2006.01)

(52) U.S. Cl.
CPC .............. *G11B 5/556* (2013.01); *G11B 5/596* (2013.01); *G11B 5/5547* (2013.01)

(58) Field of Classification Search
None
See application file for complete search history.

(56) References Cited

U.S. PATENT DOCUMENTS

| | | | |
|---|---|---|---|
| 5,459,624 A * | 10/1995 | Erickson et al. ........... | 360/77.02 |
| 5,793,558 A | 8/1998 | Codilian et al. | |
| 6,013,995 A | 1/2000 | Kim | |
| 6,031,684 A | 2/2000 | Gregg | |
| 6,490,120 B1 | 12/2002 | Burton et al. | |
| 6,501,613 B1 | 12/2002 | Shih | |
| 6,504,670 B1 | 1/2003 | Dittmar | |
| 6,510,016 B1 | 1/2003 | Hattori | |
| 6,563,663 B1 | 5/2003 | Bi et al. | |
| 6,614,615 B1 | 9/2003 | Ju et al. | |
| 6,636,377 B1 | 10/2003 | Yu et al. | |
| 6,686,716 B1 | 2/2004 | Predina et al. | |
| 6,738,220 B1 | 5/2004 | Codilian | |
| 6,781,787 B1 | 8/2004 | Codilian et al. | |
| 6,967,811 B1 | 11/2005 | Codilian et al. | |
| 6,999,267 B1 | 2/2006 | Melkote et al. | |
| 7,170,581 B2 | 1/2007 | Tousain | |
| 7,206,162 B2 | 4/2007 | Semba et al. | |
| 7,215,499 B1 * | 5/2007 | Li et al. ........................... | 360/75 |
| 7,298,574 B1 | 11/2007 | Melkote et al. | |
| 7,394,614 B2 | 7/2008 | Kang | |
| 7,626,782 B1 | 12/2009 | Yu et al. | |
| 7,839,600 B1 | 11/2010 | Babinski et al. | |
| 7,876,523 B1 | 1/2011 | Panyavoravaj et al. | |
| 8,508,881 B1 | 8/2013 | Babinski et al. | |
| 2002/0006010 A1 | 1/2002 | Ding et al. | |
| 2003/0058571 A1 | 3/2003 | Kisaka | |
| 2004/0036999 A1 | 2/2004 | Chrappan Soldavini et al. | |
| 2006/0007592 A1 * | 1/2006 | Takaishi et al. ............ | 360/78.06 |
| 2006/0082922 A1 * | 4/2006 | Shih .......................... | 360/78.06 |

(Continued)

OTHER PUBLICATIONS

Yang Quan Chen, Kevin L. Moore, Jie Yu, Tao Zhang, "Iterative Learning Control and Repetitive Control in Hard Disk Drive Industry—A Tutorial", Proceedings 2006 IEEE Conference on Decision and Control, San Diego, CA, Dec. 2006, 14 pages.

(Continued)

*Primary Examiner* — Andrew L Sniezek (57) ABSTRACT

A method of operating a disk drive is disclosed, the disk drive comprising a disk comprising a plurality of tracks, and a closed loop servo system comprising a seek servo loop and a settle servo loop for actuating the head over the disk, the settle servo loop comprising a feed-forward compensator. The seek servo loop seeks the head toward a target track, and when the head approaches the target track a state trajectory of the feed-forward compensator is initialized with an initial value in response to a measured state of the servo system. The settle servo loop then settles the head on the target track in response to a feed-forward compensation generated by the feed-forward compensator.

20 Claims, 5 Drawing Sheets

(56) References Cited

U.S. PATENT DOCUMENTS

| | | |
|---|---|---|
| 2013/0229135 A1 | 9/2013 | Long et al. |
| 2013/0231891 A1 | 9/2013 | Long et al. |

OTHER PUBLICATIONS

Mingxuan Sun, Danwei Wang, "Closed-loop iterative learning control for non-linear systems with initial shifts", International Journal of Adaptive Control Signal Process, 16 (7), 2002, 515-538, 24 pages.

Douglas A. Bristow, Marina Tharayil, Andrew G. Alleyne, "A Survey of Iterative Learning Control a learning-based method for high-performance tracking control", IEEE Control Systems Magazine, 2006, vol. 26: pp. 96-114, 19 pages.

F. L. Lewis, M. A. Christodoulou, B. G. Mertzois, "System Inversion using Orthogonal Functions", Circuits Systems Signal Process, vol. 6, No. 3, 1987, 16 pages.

\* cited by examiner

DISK DRIVE EMPLOYING MODEL-BASED FEED-FORWARD COMPENSATION DURING SEEK SETTLING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
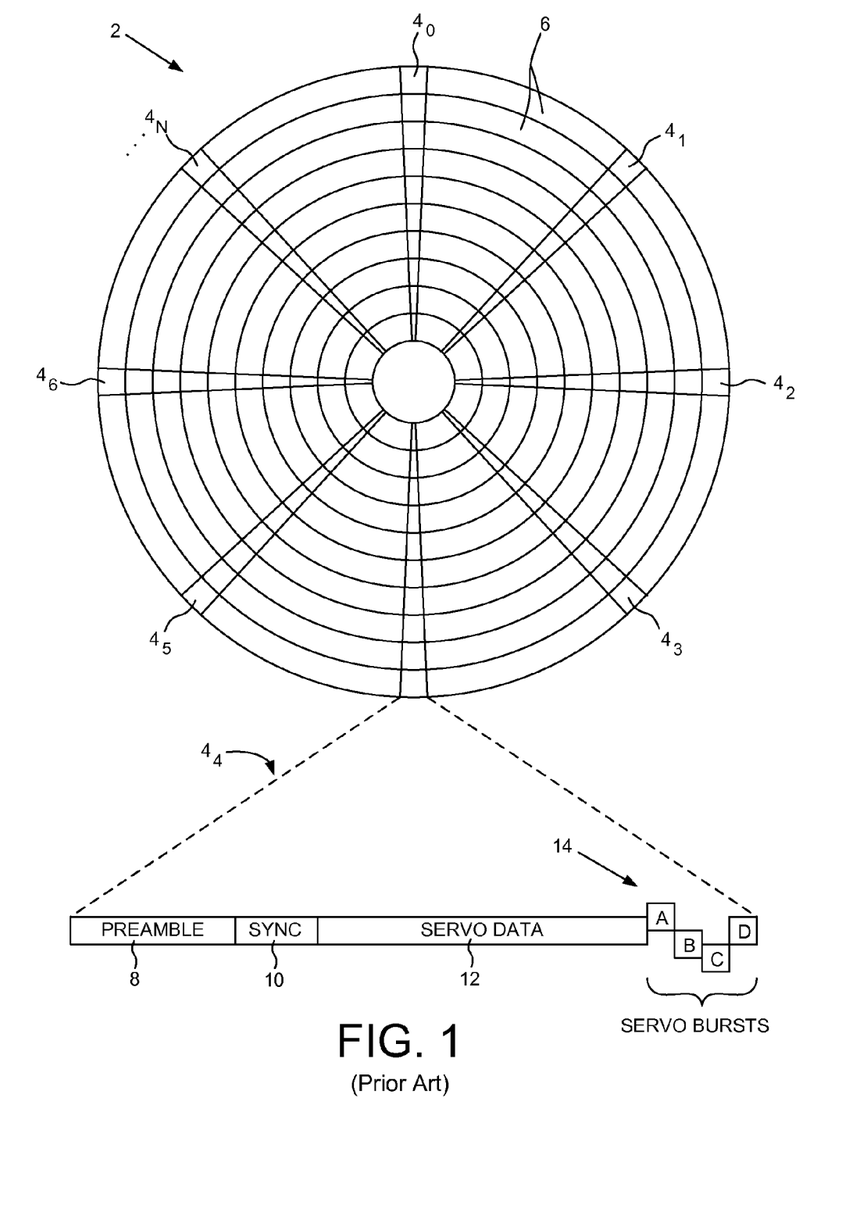
FIG. 1 shows a prior art disk format comprising a number of data tracks defined by servo sectors.

FIG. 1 shows a prior art disk format 2 as comprising a number of servo tracks 6 defined by servo sectors $4_0$-$4_N$ recorded around the circumference of each data track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $4_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a servo track during write/read operations.

DETAILED DESCRIPTION

Figure 2A:
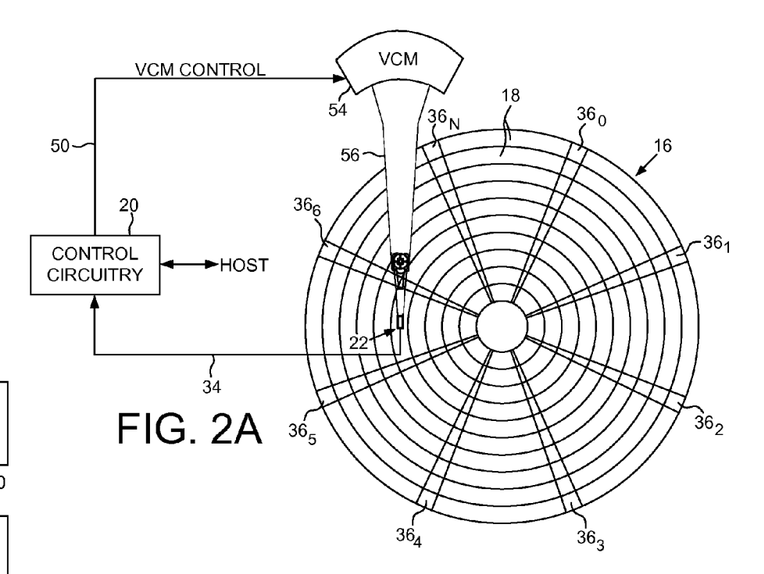
FIG. 2A shows a disk drive according to an embodiment of the present invention comprising a head actuated over a disk.

FIG. 2A shows a disk drive according to an embodiment of the present invention comprising a disk 16 comprising a plurality of tracks 18, and control circuitry 20 comprising a closed loop servo system (FIG. 2B) comprising a seek servo loop and a settle servo loop for actuating a head 22 over the disk 16, the settle servo loop comprising a feed-forward compensator 24. The control circuitry 20 is operable to execute the flow diagram of FIG. 2C wherein the seek servo loop seeks the head toward a target track (block 26). When the head approaches the target track (block 28), a state trajectory of the feed-forward compensator is initialized with an initial value in response to a measured state of the servo system (block 30). The settle servo loop then settles the head on the target track in response to a feed-forward compensation generated by the feed-forward compensator (block 32).

In the embodiment of FIG. 2A, the control circuitry 20 processes a read signal 34 emanating from the head 22 to demodulate servo sectors $36_0$-$36_N$ on the disk 16 and generate a position error signal (PES) 38 representing an error between the measured position of the head 40 and a target position relative to a target trajectory 42. The servo control system (FIG. 2B) filters the PES 38 using a suitable feedback compensator 44 to generate a control signal 46. During the settle operation, the control signal 46 is adjusted using feed-forward compensation 48 to generate an adjusted control signal 50 applied to a head actuator 52, such as a voice coil motor (VCM) 54 which rotates an actuator arm 56 about a pivot, thereby actuating the head 22 radially over the disk 16 in a direction that reduces the PES 38. The measured position of the head 40 is generated by reading position information derived from the servo sectors $36_0$-$36_N$, such as a track address for coarse positioning and servo bursts for fine positioning. The servo bursts may comprise any suitable pattern, such as an amplitude based servo pattern as shown in FIG. 1, or a suitable phase based servo pattern.

Figure 2B:
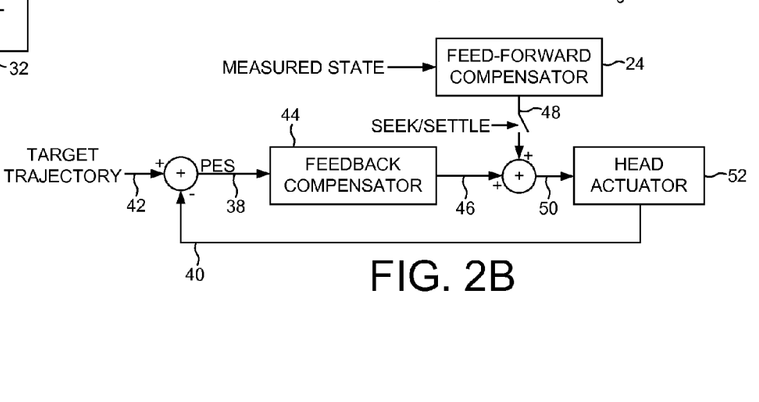
FIG. 2B shows control circuitry comprising a closed loop servo system comprising a seek servo loop and a settle servo loop for actuating the head over the disk, the settle servo loop comprising a feed-forward compensator according to an embodiment of the present invention.
Figure 2C:
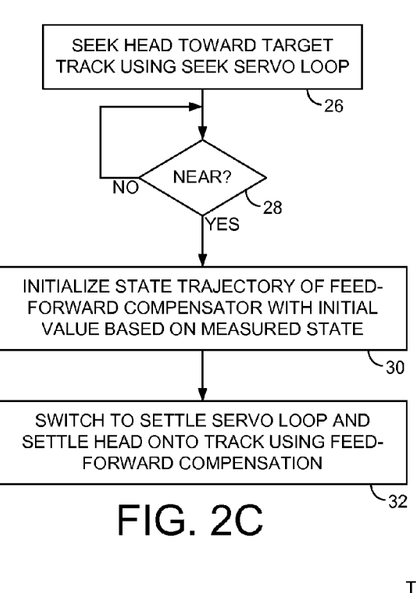
FIG. 2C is a flow diagram according to an embodiment of the present invention wherein a state trajectory of the feed-forward compensator is initialized during a seek operation based on a measured state of the closed loop servo system.
Figure 3A:
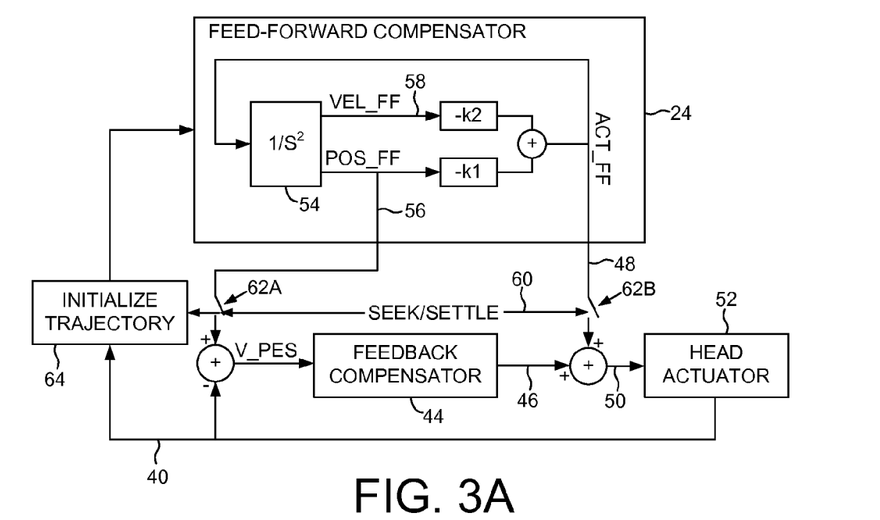
FIG. 3A shows an embodiment of the present invention wherein the feed-forward compensator generates an estimated position of the head relative to the target track and an estimated velocity of the head based on a model of the closed loop servo system.

FIG. 3A shows an embodiment of the present invention wherein the feed-forward compensator 24 generates an estimated state based on a model 54 of the closed loop servo system. In the embodiment of FIG. 3A, the estimated state generated by the feed-forward compensator 24 comprises an estimated position 56 of the head relative to a target track, and an estimate velocity 58 of the head. The estimated states are multiplied by respective scalars −k1 and −k2, and the results summed to generate the feed-forward compensation 48. The estimated position 56 and the estimated velocity 58 of the head are initialized based on a measured state of the servo system at the beginning of the settle operation (when the head nears the target track during a seek operation). In one embodiment, the estimated states in the feed-forward compensator 24 are initialized based on a measured position 40 of the head (derived from reading the servo sectors $36_0$-$36_N$) and a measured velocity of the head (e.g., based on the derivative of the measured position 40). The scalars k1 and k2 are also initialized based on the measured state of the servo system in order to initialize the state trajectory of the feed-forward compensator 24. After initializing the estimated states and the scalars, the model 54 of the closed loop servo system will generate the feed-forward compensation 48 so that the estimated states (estimated position 56 and estimated velocity 58) follow the state trajectory, thereby causing the actual states of the servo system to substantially follow the state trajectory. In the embodiment of FIG. 3A, a virtual position error signal (V_PES) is generated based on the difference between the estimated position 56 and the measured position 40 so that the feedback compensator 44 compensates for the error between the estimated and measured states (i.e., the target trajectory 42 in FIG. 2B is generated by the model 54 in FIG. 3A as the estimated position 56).

In the embodiment of FIG. 3A, the model 54 of the closed loop servo system comprises a second order system (a double integrator) that can be normalized and represented by the following continuous time state space equation:

$$\begin{bmatrix} \dot{x}_1(t) \\ \dot{x}_2(t) \end{bmatrix} = \begin{bmatrix} 0 & 1 \\ 0 & 0 \end{bmatrix} \begin{bmatrix} x_1(t) \\ x_2(t) \end{bmatrix} + \begin{bmatrix} 0 \\ 1 \end{bmatrix} u(k-1)$$

$$y = \begin{bmatrix} 1 & 0 \end{bmatrix} \begin{bmatrix} x_1(t) \\ x_2(t) \end{bmatrix}$$

$$y = x_1 : PES;\ x_2 : VEL$$

The above continuous time state space equation can be transformed into a discrete time representation:

$$\begin{bmatrix} x_1(k) \\ x_2(k) \end{bmatrix} = \begin{bmatrix} 1 & 1 \\ 0 & 1 \end{bmatrix} \begin{bmatrix} x_1(k-1) \\ x_2(k-1) \end{bmatrix} + \begin{bmatrix} 0.5 \\ 1.0 \end{bmatrix} u(k-1)$$

$$y = \begin{bmatrix} 1 & 0 \end{bmatrix} \begin{bmatrix} x_1(k-1) \\ x_2(k-1) \end{bmatrix}$$

$$y = x_1 : PES;\ x_2 : VEL$$

Assuming the feedback for the above internal model is:

$$u(k) = -[k1\ k2]\begin{bmatrix} x_1(k-1) \\ x_2(k-1) \end{bmatrix}$$

then the model can be rewritten as:

$$\begin{bmatrix} x_1(k) \\ x_2(k) \end{bmatrix} = \begin{bmatrix} 1 - 0.5 \cdot k1 & 1 - 0.5 \cdot k2 \\ -k1 & 1 - k2 \end{bmatrix} \begin{bmatrix} x_1(k-1) \\ x_2(k-1) \end{bmatrix}$$

Figure 3B:
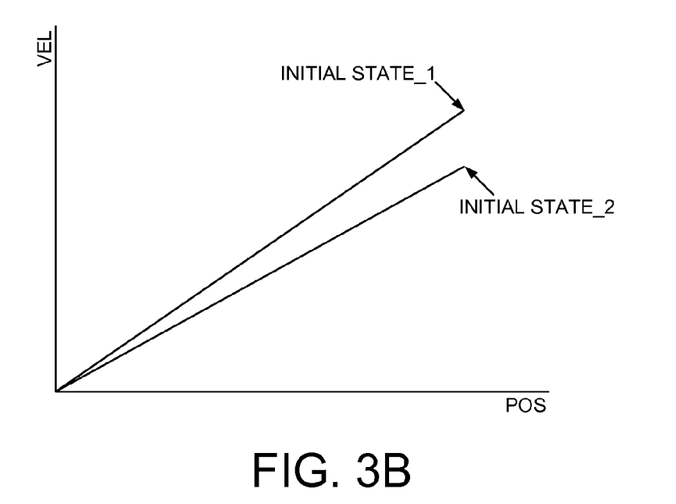
FIG. 3B shows an embodiment of the present invention wherein the state trajectory comprises a linear trajectory.

If the state trajectory of the feed-forward compensator 24 is a straight line approaching in the phase plane (VEL vs POS) as shown in FIG. 3B, then the above equation simplifies to k1=0, k2=R=VEL(0)/POS(0), where POS(0) represents the measured position 40 and VEL(0) represents the measured velocity of the head at the beginning of the settle operation (when the head nears the target track during a seek operation) and the scalar k2 represents the slope (R) of the straight line. As shown in FIG. 3B, the slope of the linear trajectory will vary based on the measured position and velocity at the beginning of the settle operation.

Referring again to the embodiment shown in FIG. 3A, at the beginning of the settle operation a control signal 60 closes switches 62A and 62B to enable generation of the V_PES and to enable the feed-forward compensation 48. The control signal 60 also signals block 64 to initialize the estimated states (POS_FF and VEL_FF) based on the measured states (e.g., the measured position 40 of the head) as well as initialize the scalars k1 and k2 (such as initializing k2 to establish the slope of the above-described linear trajectory).

In the embodiment of FIG. 3A, the feed-forward compensator 24 generates estimated states for the position 56 and velocity 58 of the head. In other embodiments, the feed-forward compensator 24 may generate other states, or additional states such as acceleration or jerk. The feed-forward compensator 24 may also comprise a more sophisticated model 54 and/or a more sophisticated state trajectory (other than the above-described linear trajectory).

Figure 4A:
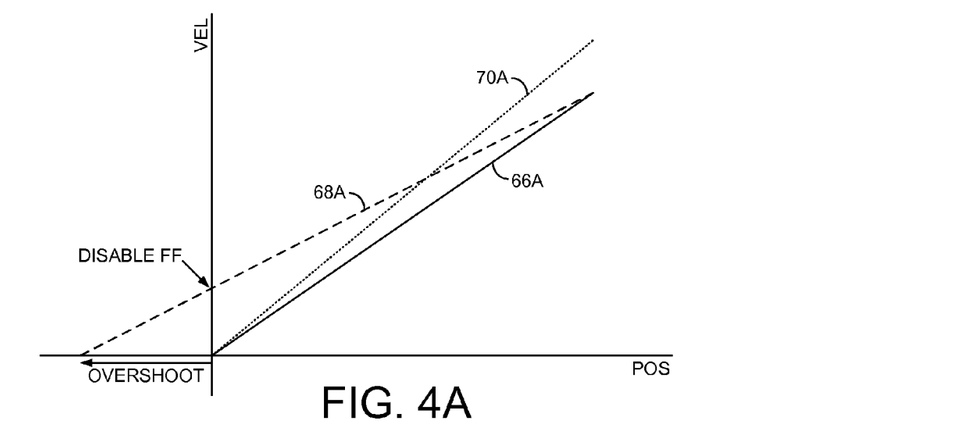
FIG. 4A shows an embodiment of the present invention wherein the linear state trajectory may be modified to improve performance.
Figure 4B:
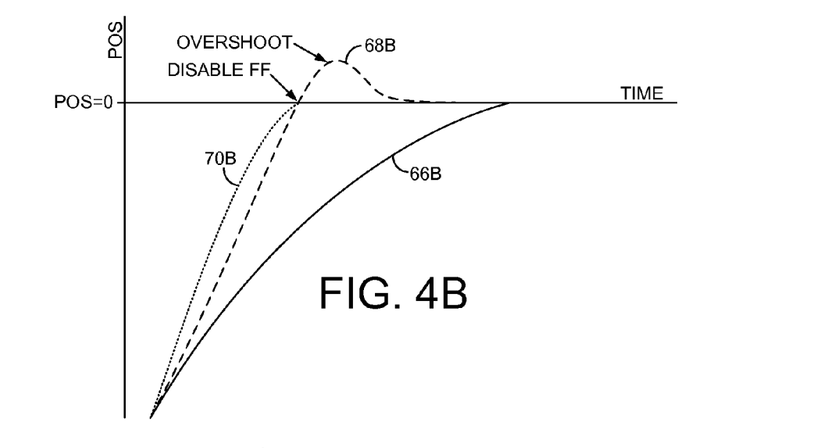
FIG. 4B illustrates how modifying the linear state trajectory may help improve performance according to an embodiment of the present invention.

In one embodiment, there may be properties of the state-space model that can reduce the performance of the seek/settle operation. For example, in the above-described discrete-time state space model there is an eigenvalue close to one which increases the time needed for the states to reach the origin of the state trajectory (VEL=0 and PES=0). An increase in the settle time decreases performance of the disk drive, particularly if the head reaches the target track too late requiring a slipped revolution. In one embodiment, the state trajectory may be selected relative to the measured states so as to improve performance of the disk drive. This is illustrated in FIGS. 4A and 4B wherein the linear trajectory 66A (FIG. 4A) derived according to the above equations results in an increased settle time 66B (FIG. 4B). In one embodiment, the linear trajectory 66A may be modified (by decreasing the slope) to arrive at linear trajectory 68A which causes an overshoot during the settle time 68B when the head reaches the target track. The linear trajectory 68A may be selected so that the overshoot during the settle time 68B will be compensated faster than the original settle time 66B. In one embodiment, the feed-forward compensator 24 is disabled when the overshoot is detected (i.e., when the measured position 40 of the head overshoots the target track), thereby allowing the feedback compensator 44 to compensate for the overshoot. In yet another embodiment, the slope of the linear trajectory may be increased relative to the original linear trajectory 66A to arrive at linear trajectory 70A (FIG. 4A) which causes the head to approach the target track faster without an overshoot as illustrated in the settle time 70B shown in FIG. 4B.

Figure 5:
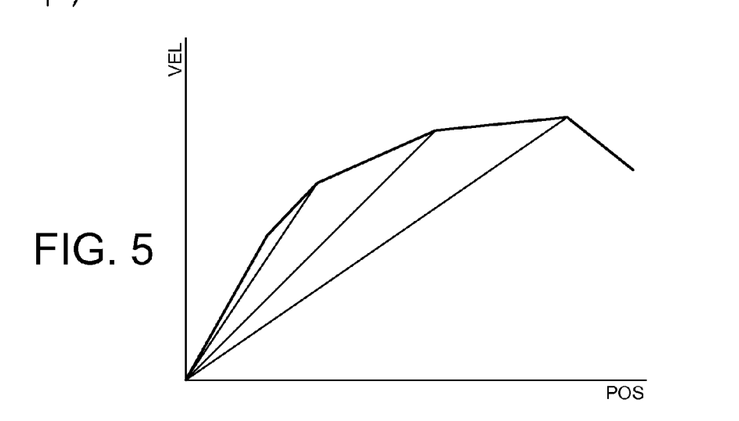
FIG. 5 shows an embodiment of the present invention wherein the slope of a linear state trajectory is adjusted in response to an updated measured state.

In one embodiment, the control circuitry 20 updates the measured state of the servo system during the settle operation while settling the head onto the target track. For example, the control circuitry 20 may measure the position 40 of the head each time a servo sector is read, and then adjust the state trajectory in response to the updated measured state. An example of this embodiment is illustrated in FIG. 5 wherein the slope of a linear trajectory may be adjusted each time the measured position of the head is updated (e.g., at each servo sector).

Figure 6:
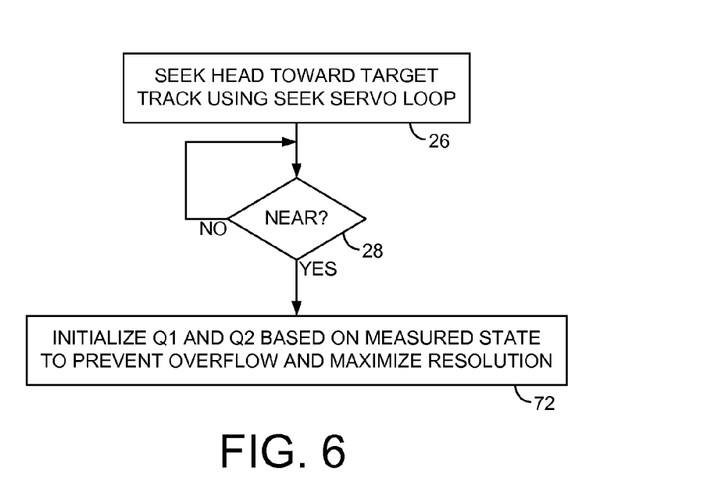
FIG. 6 is a flow diagram according to an embodiment of the present invention wherein scalar values Q1 and Q2 are initialized based on the measured state of the closed loop servo system at the beginning of the settle operation.

In one embodiment, the control circuitry 20 generates the feed-forward compensation 48 in the embodiment shown in FIG. 3A according to:

VEL_FF(k)*[(VEL(0)<<Q1)/POS(0)]>>Q2*Control_Gain where Q1 and Q2 are scalar values, and Control_Gain represents a gain of the feed-forward compensation 48. In the above equation, the Q1 and Q2 scalar values convert floating point arithmetic into fixed point arithmetic which simplifies computing the feed-forward compensation 48. FIG. 6 is a flow diagram according to an embodiment of the present invention wherein the Q1 and Q2 scalar values are initialized based on the measured state of the closed loop servo system at the beginning of the settle operation (block 72) in order to prevent overflow and maximize the resolution of the feed-forward compensation.

Figure 7:
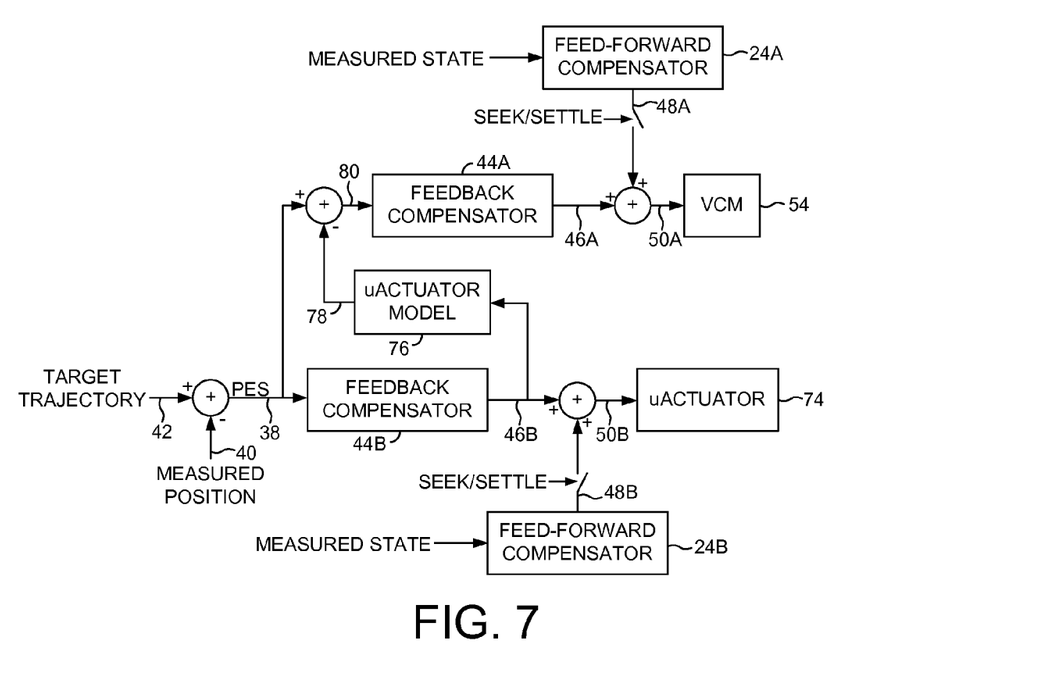
FIG. 7 shows an embodiment of the present invention wherein the closed loop servo system comprises a VCM actuator and a microactuator including respective feedback compensators and feed-forward compensators.

FIG. 7 shows an embodiment of the present invention wherein the closed loop servo system comprises a VCM actuator 54 and a microactuator 74 including respective feedback compensators 44A and 44B and feed-forward compensators 24A and 24B. The feed-forward compensators 24A and 24B are initialized in response to a measured state of the closed loop servo system at the beginning of the settle operation as described above. In one embodiment, the target trajectory 42 may be generated by combining the estimated positions generated by the feed-forward compensators 24A and 24B. In the embodiment of FIG. 7, the microactuator control signal 46B is applied to a model of the microactuator 76 which generates an estimated response 78 that is subtracted from the PES 38 to generate an adjusted PES 80 processed by the feedback compensator 44A for the VCM 54. The microactuator 74 may comprise any suitable actuating element, such as a piezoelectric (PZT) element. In addition, the microactuator 74 may be integrated into the closed loop servo system in any suitable manner, such as with a microactuator that actuates a suspension relative to the actuator arm, or a microactuator that actuates a head gimbal relative to the suspension.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of operating a disk drive, the disk drive comprising a disk comprising a plurality of tracks, a head, and a closed loop servo system comprising a seek servo loop and a settle servo loop for actuating the head over the disk, the settle servo loop comprising a feed-forward compensator, the method comprising:
    seeking the head toward a target track using the seek servo loop; and
    when the head approaches the target track:
        adjusting a state trajectory of the feed-forward compensator in response to a measured state of the servo system comprising at least one of a position of the head relative to the target track and a velocity of the head; and
        switching to the settle servo loop and settling the head on the target track in response to a feed-forward compensation generated by the feed-forward compensator, wherein:
    the state trajectory comprises a linear trajectory representing a linear relationship between the position of the head and the velocity of the head; and
    adjusting the state trajectory comprises adjusting a slope of the linear trajectory.

2. The method as recited in claim 1, further comprising the feed-forward compensator generating an estimated state of the settle servo loop in response to the initial value and the state trajectory.

3. The method as recited in claim 2, further comprising generating the estimated state based on a model of the closed loop servo system.

4. The method as recited in claim 3, wherein the estimated state comprises an estimated position of the head relative to the target track.

5. The method as recited in claim 4, further comprising generating the feed-forward compensation according to:

$$\text{VEL\_FF}(k) * [(\text{VEL}(0) << Q1) / \text{POS}(0)] >> Q2 * \text{Control\_Gain}$$

where:
    VEL_FF(k) represents an estimated velocity of the head;
    VEL(0) represents a measured velocity of the head for initializing the state trajectory;
    POS(0) represents a measured position of the head for initializing the state trajectory;
    Q1 and Q2 are scalar values; and
    Control_Gain represents a gain of the feed-forward compensation.

6. The method as recited in claim 5, further comprising initializing the Q1 and Q2 scalar values based on the measured state of the closed loop servo system in order to prevent overflow and maximize resolution of the feed-forward compensation.

7. The method as recited in claim 4, further comprising:
    generating an error signal based on a difference between the measured position of the head and the estimated position;
    processing the error signal with a feedback compensator to generate a control signal;
    adjusting the control signal in response to the feed-forward compensation to generate an adjusted control signal; and
    actuating the head over the disk in response to the adjusted control signal.

8. The method as recited in claim 1, further comprising:
    selecting the state trajectory to induce an overshoot in the settle servo loop; and
    disabling the feed-forward compensator when the overshoot is detected.

9. The method as recited in claim 1, further comprising:
    updating the measured state of the servo system while settling the head onto the target track; and
    adjusting the state trajectory in response to the updated measured state.

10. The method as recited in claim 9, wherein adjusting the state trajectory comprises adjusting the slope of the linear trajectory.

11. A disk drive comprising:
    a disk comprising a plurality of tracks;
    a head; and
    control circuitry comprising a closed loop servo system comprising a seek servo loop and a settle servo loop for actuating the head over the disk, the settle servo loop comprising a feed-forward compensator, the control circuitry operable to:

seek the head toward a target track using the seek servo loop; and when the head approaches the target track:
adjust a state trajectory of the feed-forward compensator in response to a measured state of the servo system comprising at least one of a position of the head relative to the target track and a velocity of the head; and switch to the settle servo loop and settle the head on the target track in response to a feed-forward compensation generated by the feed-forward compensator, wherein:
the state trajectory comprises a linear trajectory representing a linear relationship between the position of the head and the velocity of the head; and adjusting the state trajectory comprises adjusting a slope of the linear trajectory.

12. The disk drive as recited in claim 11, wherein the feed-forward compensator is operable to generate an estimated state of the settle servo loop in response to the initial value and the state trajectory.

13. The disk drive as recited in claim 12, wherein the control circuitry is further operable to generate the estimated state based on a model of the closed loop servo system.

14. The disk drive as recited in claim 13, wherein the estimated state comprises an estimated position of the head relative to the target track.

15. The disk drive as recited in claim 14, wherein the feed-forward compensator is operable to generate the feed-forward compensation according to:

$$VEL\_FF(k)*[(VEL(0)<<Q1)/POS(0)]>>Q2*Control\_Gain$$

where:
VEL_FF(k) represents an estimated velocity of the head;
VEL(0) represents a measured velocity of the head for initializing the state trajectory;
POS(0) represents a measured position of the head for initializing the state trajectory;
Q1 and Q2 are scalar values; and
Control_Gain represents a gain of the feed-forward compensation.

16. The disk drive as recited in claim 15, wherein the control circuitry is further operable to initialize the Q1 and Q2 scalar values based on the measured state of the closed loop servo system in order to prevent overflow and maximize resolution of the feed-forward compensation.

17. The disk drive as recited in claim 14, wherein the control circuitry is further operable to:
generate an error signal based on a difference between the measured position of the head and the estimated position;
process the error signal with a feedback compensator to generate a control signal;
adjust the control signal in response to the feed-forward compensation to generate an adjusted control signal; and
actuate the head over the disk in response to the adjusted control signal.

18. The disk drive as recited in claim 11, wherein the control circuitry is further operable to:
select the state trajectory to induce an overshoot in the settle servo loop; and
disable the feed-forward compensator when the overshoot is detected.

19. The disk drive as recited in claim 11, wherein the control circuitry is further operable to:
update the measured state of the servo system while settling the head onto the target track; and
adjust the state trajectory in response to the updated measured state.

20. The disk drive as recited in claim 19, wherein the control circuitry is further operable to adjust the state trajectory by adjusting the slope of the linear trajectory.

* * * * *